US012118285B1

United States Patent
Hoang

(10) Patent No.: US 12,118,285 B1
(45) Date of Patent: Oct. 15, 2024

(54) SYSTEMS AND METHODS FOR ANALOG INTEGRATED CIRCUITS (IC) DESIGN USING QUANTUM EVOLUTION ALGORITHMS (QEAS)

(71) Applicant: Trang Hoang, Ho Chi Minh (VN)

(72) Inventor: Trang Hoang, Ho Chi Minh (VN)

(73) Assignee: HO CHI MINH CITY UNIVERSITY OF TECHN, Ho Chi Minh (VN)

( * ) Notice: Subject to any disclaimer, the term of this patent is extended or adjusted under 35 U.S.C. 154(b) by 0 days.

(21) Appl. No.: 18/418,454

(22) Filed: Jan. 22, 2024

(51) Int. Cl.
| | |
|---|---|
| G06F 30/36 | (2020.01) |
| G06F 30/367 | (2020.01) |
| G06F 30/373 | (2020.01) |
| G06N 10/00 | (2022.01) |
| G06N 10/60 | (2022.01) |
| G06N 10/80 | (2022.01) |
| G06F 111/06 | (2020.01) |

(52) U.S. Cl.
CPC ............ G06F 30/36 (2020.01); G06F 30/367 (2020.01); G06F 30/373 (2020.01); G06N 10/00 (2019.01); G06N 10/60 (2022.01); G06N 10/80 (2022.01); *G06F 2111/06* (2020.01)

(58) Field of Classification Search
None
See application file for complete search history.

(56) References Cited

U.S. PATENT DOCUMENTS

| | | | | |
|---|---|---|---|---|
| 11,079,790 | B2* | 8/2021 | Fernandes Ramos | .... H03L 7/18 |
| 11,494,681 | B1* | 11/2022 | Peterson | ................ G06N 10/00 |
| 2008/0140749 | A1* | 6/2008 | Amato | .................... G06N 10/00 |
| | | | | 708/490 |
| 2018/0091440 | A1* | 3/2018 | Dadashikelayeh | ..... H04L 63/20 |
| 2023/0394344 | A1* | 12/2023 | Cao | ......................... G06N 10/60 |

FOREIGN PATENT DOCUMENTS

CN  114912398 A  *  8/2022  ............. Y04S 10/50

OTHER PUBLICATIONS

K.-H. Han et al., "Quantum-Inspired Evolutionary Algorithm for a Class of Combinatorial Optimization," IEEE Trans. on Evolutionary Computation, vol. 6, No. 6, Dec. 2002, pp. 580-593. (Year: 2002).*

J. Dai et al., "A Novel Quantum Genetic Algorithm for Area Optimization of FPRM Circuits," 2009 Third Int'l Symposium on Intelligent Information Technology Application, IEEE Computer Society, pp. 408-411. (Year: 2009).*

(Continued)

*Primary Examiner* — Leigh M Garbowski

(57) ABSTRACT

A computer implemented method for designing electrical circuitry is disclosed which comprises: (a) determining types and number of parameters to be optimized and their respective upper boundaries (UB) and lower boundaries (LB) in binary and/or decimal formats for such electrical circuitry using a CAD/CAE/EDA module of a quantum emulator computer; and (b) optimizing the parameters in qubit formats using a quantum evolution optimization module constrained by the upper and lower boundaries; the quantum emulator computer includes the CAD/CAE/EDA program and the quantum evolution optimization module.

20 Claims, 8 Drawing Sheets

(56) References Cited

OTHER PUBLICATIONS

Y. Wang et al., "The Application of Quantum-Inspired Evolutionary Algorithm in Analog Evolvable Hardware," 2010 2nd Conference on Environmental Science and Information Application Technology (ESIAT), IEEE pp. 330-334. (Year: 2010).*

J. van Dijk et al., "A Co-design Methodology for Scalable Quantum Processors and their Classical Electronic Interface, " 2018 IEEE Design, Automation and Test in Europe (Date 2018), pp. 573-576. (Year: 2018).*

R. Chakrabarty et al., "Design and implementation of Operational Amplifier using Quantum Dot Cellular Automata," 2019 3rd Int'l Conference on Electronics, Materials Engineering and Nano-Technology (IEMENTech), IEEE, 6 pages. (Year: 2019).*

* cited by examiner

SYSTEMS AND METHODS FOR ANALOG INTEGRATED CIRCUITS (IC) DESIGN USING QUANTUM EVOLUTION ALGORITHMS (QEAS)

FIELD OF THE INVENTION

The present invention relates generally to circuit design. More specifically, the present invention relates to the optimization for circuit design and simulation processes.

BACKGROUND ART

Today an integrated circuit (IC) chip can accommodate several to ten billions of transistors each at 5-10 nm scale into a single semiconductor die. Obviously, without proper layout and optimization, the power dissipation from this IC potentially reach to the prohibitive level of a rocket nozzle whose power density reaches 1,000 W/cm$^2$. In addition, the cost to design an IC in today technology is more than 10 million USD per chip. It is costly to make mistakes during the IC design and fabrication. Thus, optimization during IC design is essential.

Among various existing optimization methods, the genetic algorithm (GA), based on the Darwinian principle of natural selection and concepts of natural genetics, has proven an effective solution to large search spaces without being trapped in local minima. In spite of the GA's advantages, it has not been extensively applied to the field of circuit design. The GA algorithm is limited to the design of operational amplifiers (op-amps) and has not been utilized for the case of other electrical circuitry. Furthermore, the design of the op-amps uses the HSPICE simulator for circuit simulations, which normally requires an additional step of using scripting languages for collecting necessary data.

Other optimization algorithms used in IC design includes Particle Swarm Optimization (PS), Ant Colony Optimization (ACO), Simulated Annealing (SA), and Bayesian Optimization (BO). Similar to the GA, these algorithms use the 0 and 1 bits that tend to be trapped in local maxima undergoing premature convergence. This results in inaccurate design parameters for simulation.

Therefore, what is needed is a new IC design optimization algorithm that is more accurate and does not have the tendency to converge to local optimums.

What is needed is a new IC design optimization algorithm that is not limited by binary numbers.

What is needed is a new and fast algorithm that has the capability to process all possible optimal solutions at the same time.

Furthermore, what is needed is a computer program product that can improve the IC design process in the CAD/CAE/EDA software.

Finally, what is needed is a CAD/CAE/EDA module that includes optimization algorithms that improve the overall IC design process.

The optimization algorithms disclosed in the present application meet the above needs and demands in the semiconductor industry.

SUMMARY OF THE INVENTION

Accordingly, an object of the present invention is to provide a computer implemented method for designing electrical circuitry, which comprises: (a) determining types and number of parameters to be optimized and their respective upper boundaries (UB) and lower boundaries (LB) in binary or decimal formats for such electrical circuitry using a CAD/CAE/EDA module of a quantum emulator computer; and optimizing the parameters in qubit formats using a quantum evolution optimization module constrained by the upper and lower boundaries; the quantum emulator computer includes the CAD/CAE/EDA program and the quantum evolution optimization module.

Another object of the present invention is to provide a method for designing electrical circuitry that combines a CAD/CAE/EDA circuit design and a quantum evolution optimization (QEA) process.

Another object of the present invention is to provide a computer implemented algorithm for designing complex electrical circuitry is disclosed which includes combining complex circuit design and quantum evolution optimization algorithm (QEA) to achieve efficiency, accuracy, and fast rate of convergence.

Another object of the present invention is to provide a method for designing electrical circuitry that has a fast converging rate and does not mistakenly converge to and be trapped at the local maxima.

Another object of the present invention is to provide a computer system for designing and simulating electrical circuitry is disclosed which comprises: a CAD/CAE/EDA module operable to assisting in a design and a simulation of such electrical circuitry; and a quantum emulator module operable to optimize parameters of such electrical circuitry in a quantum qubit environment.

Another object of the present invention is to provide a system capable of combining CAD/CAE/EDA circuit design software and quantum emulator optimization process.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, and components have not been described in detail so as not to unnecessarily obscure aspects of the present invention.

Disclosed in the present specification is a novel integrated circuit (IC) design computer implemented software program that integrates quantum-inspired evolution optimization algorithms and the IC design and simulation algorithms. That is, the IC design program provides the constraints and initial values to a quantum evolution algorithm (QEA) to find the optimal parameters. The optimal parameters are used to improve the design and simulation of the IC design program.

Figure 1:
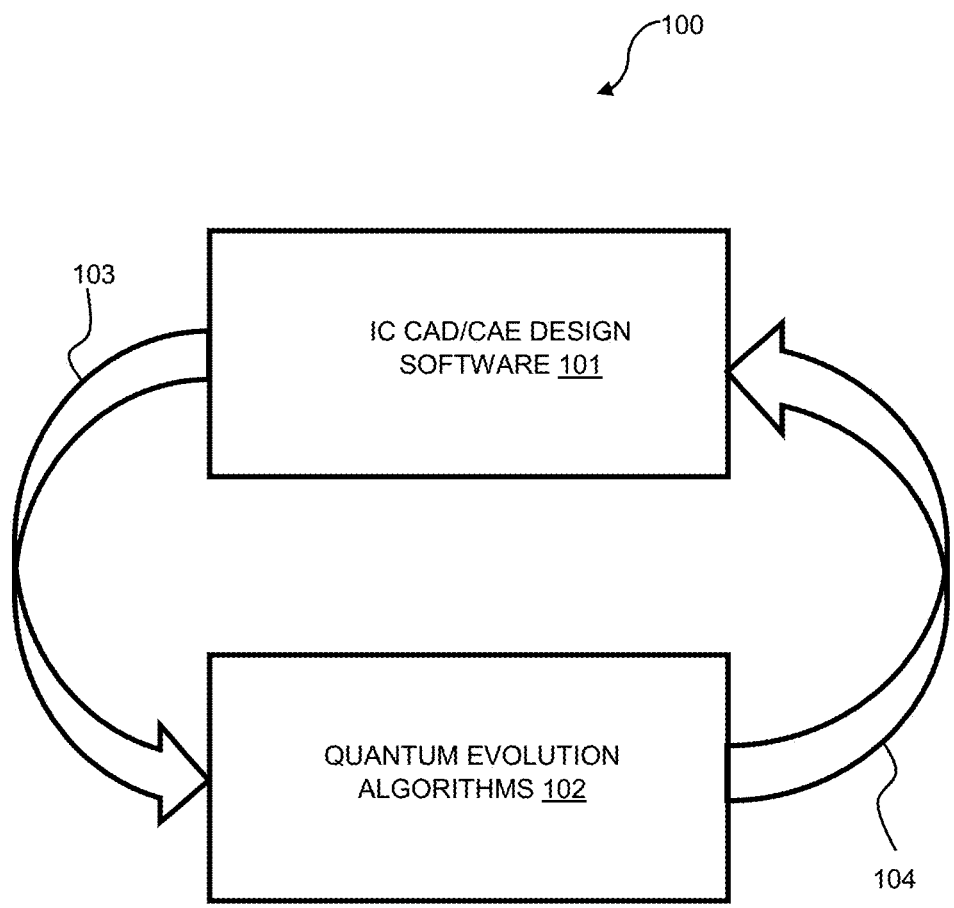
FIG. 1 illustrates a conceptual block diagram including an integrated circuit design module and a quantum evolutionary algorithms in accordance with one exemplary embodiment of the present invention.

Now referring to FIG. 1, a conceptual block diagram 100 illustrates the operating principle of the present invention. An integrated circuit (IC) design software 101 receives design specifications to calculate the boundary conditions such as objective function ($f_{obj}$), upper bound (UB) and lower bound (LB) for the circuit variables to be optimized. The boundary conditions are generated in a text file 103. A quantum evolution algorithm 102 uses these boundary conditions to locate optimal solutions in form of binary streams 104 which is, in turned, fed to IC design software 101. The optimization process is performed by the QEA algorithm in a Hilbert space. Finally, the optimal solutions are used by IC design software 101 to finalize the design and simulation of the electrical circuitry. It will be shown in the present disclosure that the QEA enables the optimization process for the circuit parameters to converge to the correct optimized values faster using less iterative steps.

Figure 2:
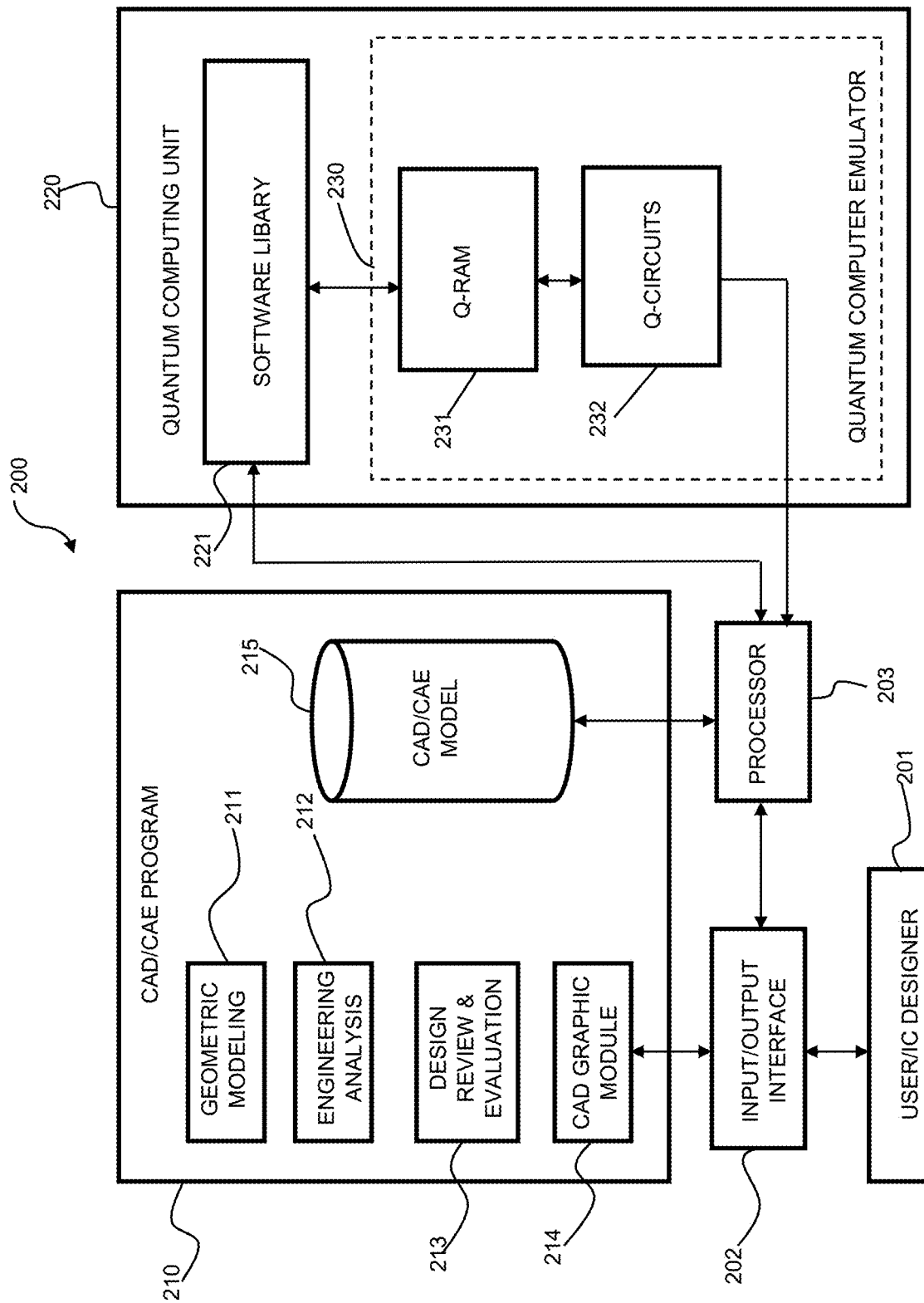
FIG. 2 illustrates a conceptual quantum computer emulator that combines the IC design and quantum evolutionary algorithms (QEA) into a novel IC design software application in accordance with one exemplary embodiment of the present invention.

Next referring to FIG. 2, a system diagram of a system 200 designed to operate quantum evolution algorithm 100 described above. System 200 includes a user terminal 201, an input/output interface 202, a processor 203, a CAD/CAE/EDA program 210, and a quantum computing unit 220. Examples of CAD/CAE/EDA program 210 includes but not limited to such Cadence/Virtuoso program, HSPICE, EDA (electronic design automation), Java, Mathlab, etc. User terminal 201 maybe a keyboard, a mouse, and/or a computer terminal such as a desktop, a laptop, and a tablet. Input/output interface 202 may be graphic user interface (GUI) such as GUI 300 described next in FIG. 3. Processor 203 may be a classical central processing unit (CPU) that can simulate quantum computation. In some embodiments, processor 203 maybe a graphic processing unit (GPU) capable of emulating quantum computation such as Pauli gates, swap gate, rotation gate, and Hadamard gate in a computer 440 described in FIG. 4. CAD/CAE/EDA unit 210 further includes a geometric modeling unit 211, an engineering analysis unit 212, a design review and evaluation unit 213, a CAD graphic module 214, and a storage for CAD/CAE/EDA models 215. Geometric modeling unit 211 includes Non-Uniform Rational B-Spline (NURBS) and mesh models that apply discretization and numerical simulation. Engineering analysis unit 212 is designed to solve the electromagnetic, electronics, thermodynamic, and electromechanical simulations under wide-ranging operating conditions. Design review and evaluation unit 281 is designed to perform evaluations of the design parameters such as bandwidth, gain, noise, delay, power consumption, phase margin. CAD graphic module 214 enables drawings and handlings of circuit models (see Example 1 and Example 2). CAD/CAE/EDA model 215 is a non-transitory memory storage that stores circuit models previously created.

Continuing to FIG. 2, quantum computing unit 220 includes a software library 221 and a quantum computer emulator 230. Software library 221 is a non-transitory computer memory used to store quantum inspired software modules such as quantum genetic algorithms, Qitensor, QuTip, SymPy, IBM QExperience, Quantum Assembly language, jQuantum, and Microsoft, etc. Quantum computer emulator 230 further includes quantum RAM (Q-RAM) 231 and quantum circuits (Q-circuits) 232. Q-RAM 231 stores qubits, chromosomes, and rotation angles $\ominus$. Q-circuits 232 includes operations such as Pauli gates X, Y, Z, and I. Quantum computing unit 220 is used to implement steps 504, 505, and 509 described in FIG. 5.

Figure 3:
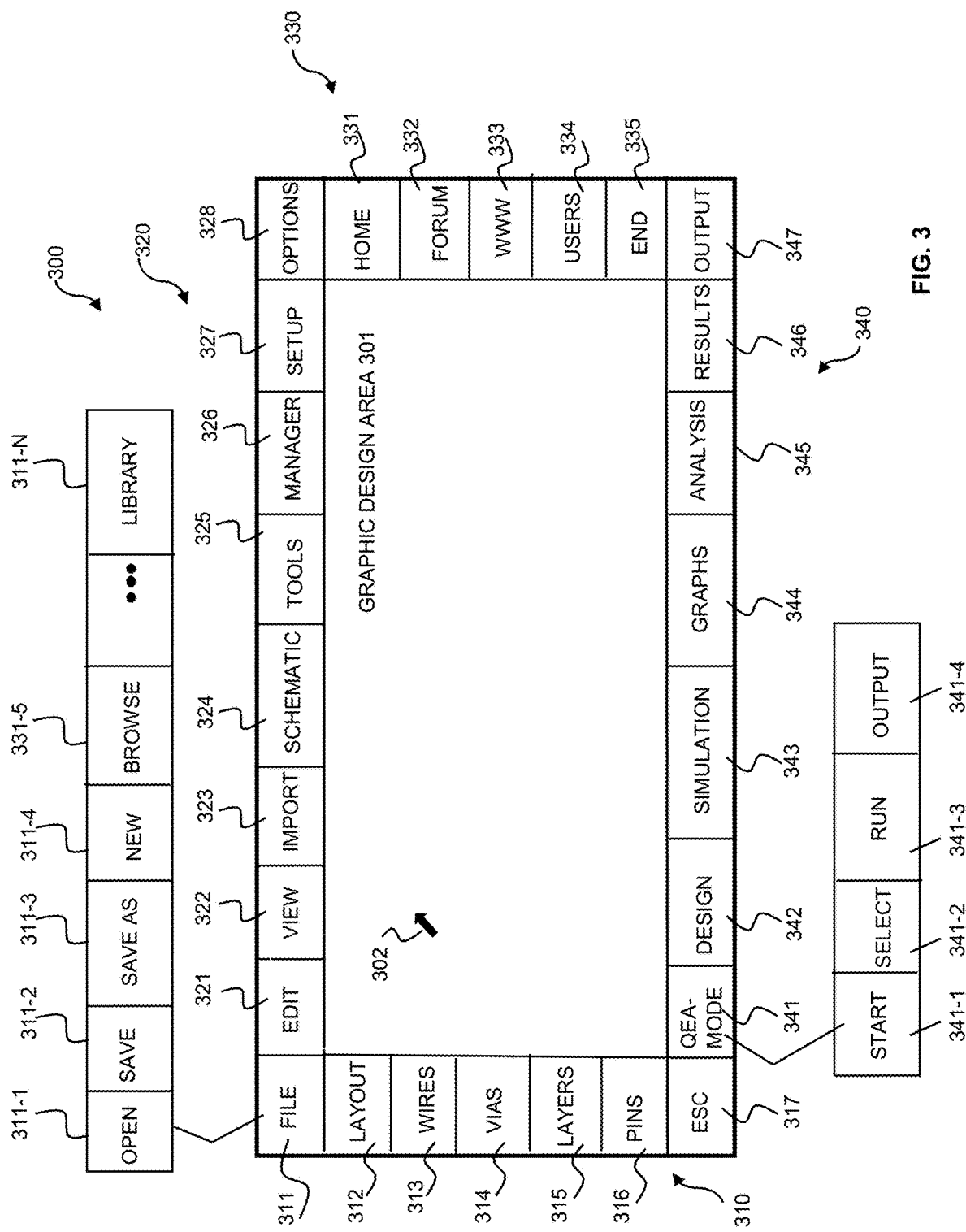
FIG. 3 illustrates a graphic user interface (GUI) of the quantum computer emulator that enables a user (IC designer) to design an IC circuits using a CAD/CAE/EDA module that uses the optimization results of quantum evolutionary algorithms (QEA) in accordance with an exemplary embodiment of the present invention.

Now, referring to FIG. 3, a perspective diagram of a graphic user interface (GUI) 300 that is generated by system 200 in accordance with an exemplary embodiment of the present invention is illustrated. Generally, GUI 300 comprises tool bars including tools 311 to 347 arranged around the perimeter of a graphic design area 301. Graphic design area 301 displays the design circuitry such as a dynamic comparator in Example 1 and two-stage an op-amp circuit 800 in Example 2. A cursor 302 is used to place circuit components of together.

The following are some exemplary function menus of GUI 300 includes, but not limited to, the followings: (1) a first toolbar 310 includes a File 311, a Layout 312, Wires 313, Vias or Holes 314, Layers 315, Pins 316, and Escape (ESC) 317; (2) a second toolbar 320 includes: an Edit 321, View 322, Import 323, Schematic 324, Tools 325, Manager 326, Setup 327, and Options 328; (3) a third toolbar 330 includes: a Home 331, a Forum 332, a Worldwide web 333, Users 334, an End 335; and (4) a fourth toolbar 340 includes:

a QEA-mode 341, a Design 342, a Simulation 343, Graphs 344, an Analysis 345, a Result 346, and an Output 349. It is noted that the arrangement presented above is only a non-limiting example of a possible way GUI 300 is arranged. Other arrangement of look-and-feel of GUI 300 is also within the scope of the present invention. It is further noted that these menus 311 to 347 listed above are well-known in the CAD/CAE/EDA design software such as Cadence/Synopsis and need not to be described in details here.

Continuing with FIG. 3, File menu 311 is a drop-down menu including sub-menus grouped together such as Opening previous files 311-1, Save 321-2, Save As 311-3, New 311-4, Browse 311-5 and Library 311-N. In other embodiments of the present invention, all menus 311-347 include sub-menus.

Continuing with FIG. 3, in one exemplary embodiment of the present invention, a bottom horizontal tool bar 340 of GUI 300 is comprised of a quantum inspired function such as a Quantum Evolution Optimization (QEA) menu 341, a Design 342, Simulation 343, Graph 344, Analysis 345, Results 346, and Output 347. Except QEA mode 341, other menus 342-347 are self-explanatory and well-known in the CAD/CAE/EDA software arts and therefore they need not to be described. They are functions of the classical CAD/CAE/EDA IC design software such as Cadence/Synopsys. When cursor 302 is moved to QEA-mode button 341, a drop-down menu appears. The drop-down menu includes a Start button 341-1, a Select button 341-2, a Run (Execute) button 341-3, and an Output (Export) button 341-4. When Start button 341-1 is selected, a library of quantum-inspired optimization software is displayed. The quantum-inspired optimization software includes DIY software such as Python, Java, C++, and other software such as PyQu, QiTensor, QuTip, SymPy, IBM QExperience, Quantum Assembly Language Quantum Information Software Kit (QISKit), Mathlab, other software development kits (SDK). These software can be downloaded from the when WWW button 333 is used. Alternatively, they can be obtained from other users when Users button 334 is selected since system 200 described in FIG. 2 of the present invention is a network computer. Please refer also to FIG. 4 for more information on QEA computer 400. After a QEA software is selected for the optimization tasks, Select button 341-2 is used to select the text file that contain the variables to be optimized and the values. Furthermore, Select button 341-2 is also used to select the IC circuit to be simulated based on the optimization results. Output button 341-4 is used when the optimization task using quantum evolution algorithm 500 is completed. Output button 341-4 is used to implement step 510. It is noted again that the functions and sub-menus all menus 311-347 in GUI 300 are self-explanatory to IC designers and need not to explain in details in the present disclosure.

Figure 4:
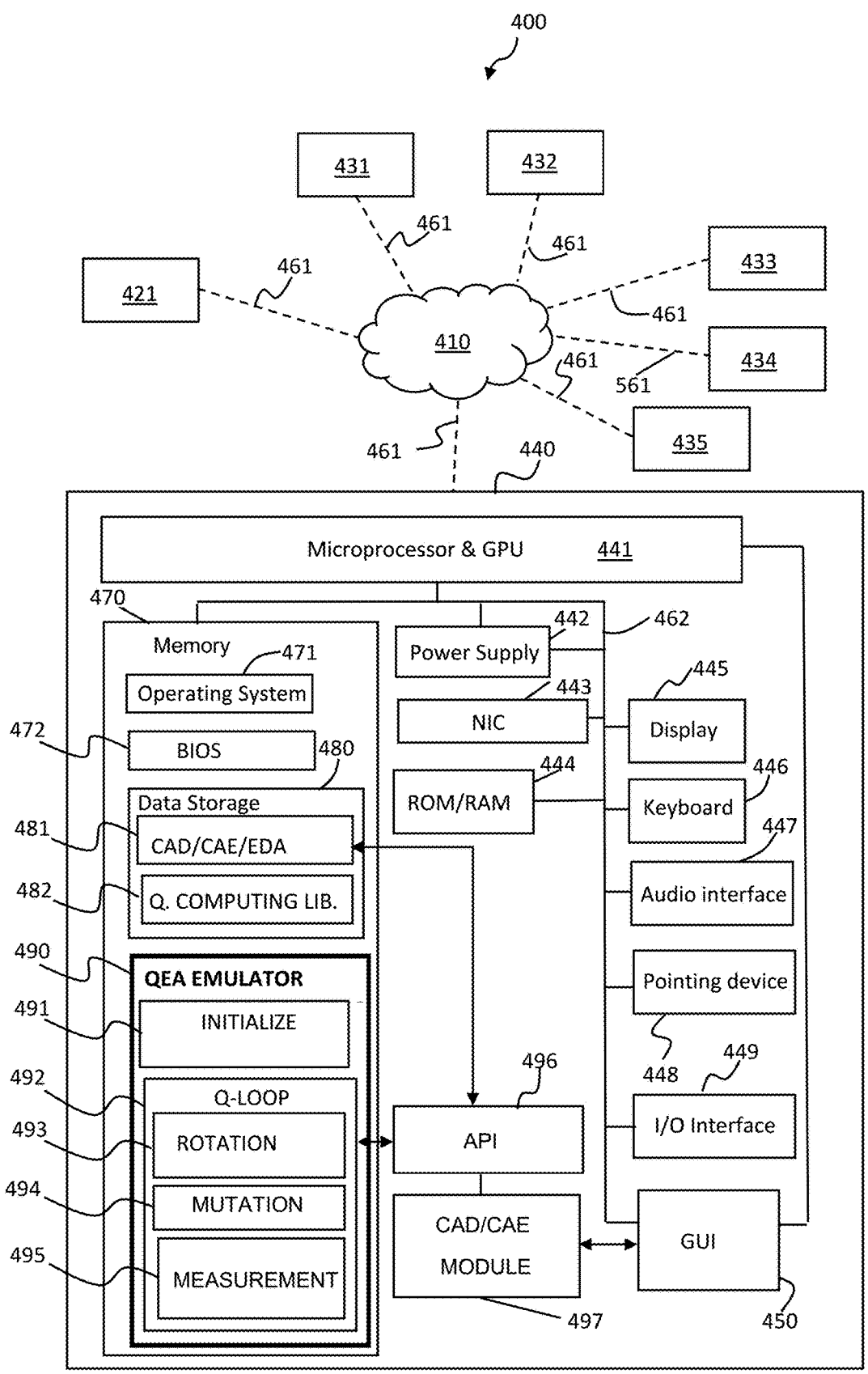
FIG. 4 illustrates a computer system that includes a CAD/CAE/EDA circuit design and a quantum evolution algorithm (QEA) in accordance with an exemplary embodiment of the present invention.

Now referring to FIG. 4, a schematic diagram of a quantum evolution algorithm (QEA) computer system 400 based on the novel concept presented in FIG. 1 and system 200 in FIG. 2 in accordance with an exemplary embodiment of the present invention is illustrated. In many embodiments, computer system 400 includes personal desktop computers, a laptops, a smart phones, or a tablets that can connect to one another via a network. Computer system 400 includes a quantum evolution algorithm based computer (QEA computer) 440 electrically coupled to other computers 421, 431, 432, 433, 434, . . . 435 via a communication lines 461 to a network 410. QEA computer 440 includes, but not limited to, input/output interface 449, memory 470, a central processing unit (CPU) 441, a graphic user interface (GUI) 450, a display unit 445, and a power supply unit 442, all electrically coupled to one another via communication link 462. In various embodiments of the present invention, QEA computer 440 is a printed circuit board (PCB) with electrical connections 462 are conducting wires such as copper, aluminum, gold, etc. In operation, input/output interface 449 receive design specifications from clients' communication devices such as smartphones, desktop computers, laptop computers, personal digital assistance (PDA) via network 410. Communication links 462 may be wireless such as Cloud network, Bluetooth, 4G, LTE, 5G, Wi-Fi, Zigbee, Z-wave, radio frequency (RF), Near Field Communication (NFC), Ethernet, LoRaWAN. In some embodiments, communication links 461 is electrical wires such as RS-232, RS-485, or USB. Next, the design specification is transferred to CPU/GPU 441 for translation into software command codes that can numerically control CAD/CAE/EDA IC design tools 497. The design specification can be generated from CAD (computer aided design) and/or CAM (computer aided machining). The software commands can be Python, assembly language, C, C++, or any SPICE programming language. The design specification and the software commands are stored in memory 470. In addition, CPU/GPU 441 sends the software commands and/or the design specification to be displayed at display unit 445. In some embodiments, display unit 445 also displays GUI 300 described above.

Continuing with FIG. 4, CPU/GPU 441 controls the entire operations of QEA computer 440. In memory 470, an operating system (OS) 471 such as Microsoft, Apple's macOS, iOS, Linux, Unix, etc. a BIOS 472 such as Legacy BIOS, United Extensible Firmware Interface (UEFI). A data storage 480 contains a first memory storage 481 dedicated to store CAD/CAE/EDA software program. Non-limiting examples of circuit models are the dynamic comparator shown in FIG. 7 and the two-stage op-amp shown in FIG. 8. CAD/CAE/EDA software program when executed by CPU/GPU 441 provide IC design tools. Memory storage 481 is the same as CAD/CAE/EDA models 215 described above. A second memory storage 482 is dedicated to store a library of quantum evolution inspired optimization software. In second memory storage 482, Select button 341-2 is used to select and write scripts to a quantum inspired software program.

Figure 5:
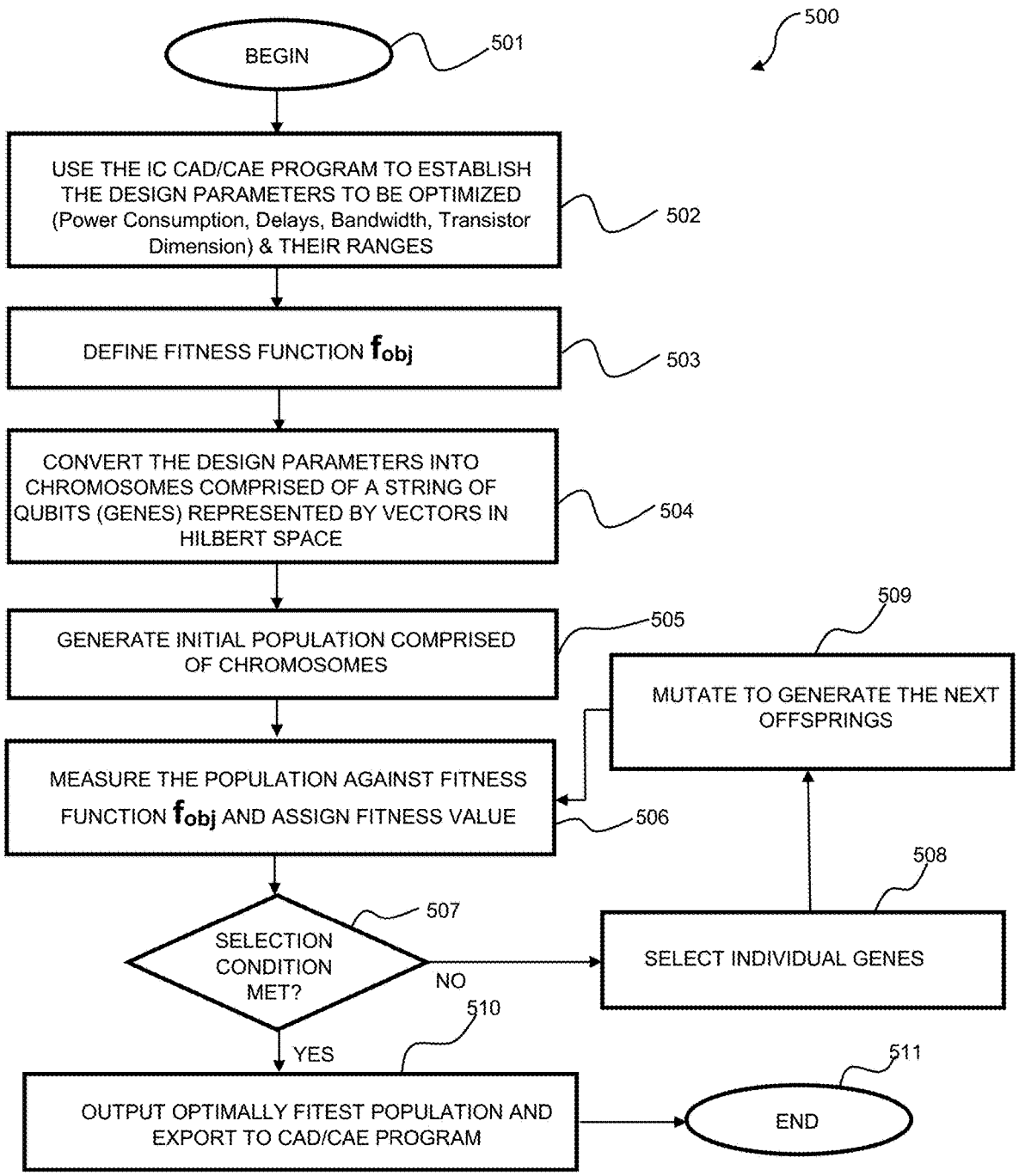
FIG. 5 illustrates a flow chart of an electrical circuit design algorithm that uses quantum evolution algorithm (QEA) to find optimal values for the design and simulation of electrical circuitry in accordance with an exemplary aspect of the present invention.

Referring again to FIG. 4, a quantum evolution algorithm (QEA) emulator 490 is configured to run the quantum evolution algorithm 500 described in FIG. 5. In various embodiments of the present invention, QEA emulator 490 is structurally similar to quantum computer emulator 230 described in FIG. 2 while CAD/CAE/EDA module 497 is similar to CAD/CAE/EDA program 210. These two software programs are handshake or interfaced by an Application Program Interface (API) 496 which is designed to facilitate the interactions between CAD/CAE/EDA module 497 and QEA emulator 490.

Continuing with FIG. 4, a quantum emulator module 490 contains an initialize module 491, a Q-Loop 492, a rotation module 493, a mutation 494, and a quantum measurement module 494. More particularly, initialize module 491 performs steps 502-505, rotation module 493 performs steps 509, and quantum measurement module 494 performs step 506, 507, and 508. Please refer back to FIG. 2 for more comprehensive descriptions of quantum emulator module 490. In other words, when QEA-mode menu 341 is selected, CPU/GPU 441 executes QEA emulator software program to perform algorithm 500 described next.

Next, referring to FIG. 5, a computer implemented algorithm 500 (software 500) integrated in an integrated circuit (IC) CAD/CAE/EDA design program that implements the operation principle described above in FIG. 1 is illustrated. In various embodiments of the present invention, computer implemented algorithm 500 is realized in software programming such as Python, Quantum Assembly language, PyQu, Qitensor, QuTIP, IBMQExperience, Quantum Information Software Kit (QISKit), Mathlab, other software development kits (SDK), etc. Algorithm 500 is executed by a QEA computer 440 (described in FIG. 4) that generates a graphic user interface (GUI) 300 (see FIG. 3) that enables a user to use the software 500.

At step 501, software 500 begins by starting the specialized computer and receiving an integrated circuit (IC) to design. Step 501 is illustratively implemented by a GUI described in FIG. 3. Step 501 is realized by using QEA computer system 400 that displays GUI 300 on a display unit. In the end of step 501, the IC designer/user realizes step 501 by selecting menu button QEA-mode 341.

At step 502, the design parameters to be optimized and their limiting intervals are established by a CAD/CAE/EDA IC design program. Step 502 is implemented by IC CAD/CAE/EDA IC software program 101. In many preferred embodiments, IC CAD/CAE/EDA IC design software 101 is Cadence/Synopsys program. Design parameters to be optimized include time delay, power consumption, channel lengths, channel widths, Gain, bandwidth, phase margin, etc. In The implementation of step 502 is illustrated in Example 1 and Example 2 below.

At step 503, fitness (objective) function $f_{obj}$ is calculated using the design parameters and limiting intervals obtained from step 502. Step 503 is illustrated in in Example 1 and Example 2 below. Step 503 is implemented in a .txt file generated by Ocean software program in the Cadence/Synopsis CAD/CAE/EDA IC design program.

At step 504, the design parameters, the limiting intervals, and the objective function are used by quantum evolution algorithm 102 to initialize the quantum population $Q_0$. In the quantum evolution algorithm, the initial quantum population $Q_0$ includes a plurality of quantum chromosomes. Each quantum chromosome or the $i^{th}$ chromosome is defined as a series of n qubits (quantum bits) as follows.

$$\begin{pmatrix} \alpha_1 & \alpha_2 & \alpha_3 & \alpha_4 & \cdots & \alpha_j & \cdots & \alpha_n \\ \beta_1 & \beta_2 & \beta_3 & \beta_4 & \cdots & \beta_j & \cdots & \beta_n \end{pmatrix}_i \rightarrow |\psi\rangle^i = \sum_j c_i |\psi_j\rangle$$

With $|\psi_j\rangle$ being the $j^{th}$ generation which is represented by a qubit in superposition or in the vector form $$|\psi_j\rangle \leftrightarrow \begin{pmatrix} \alpha_j \\ \beta_j \end{pmatrix}.$$

Figure 6:
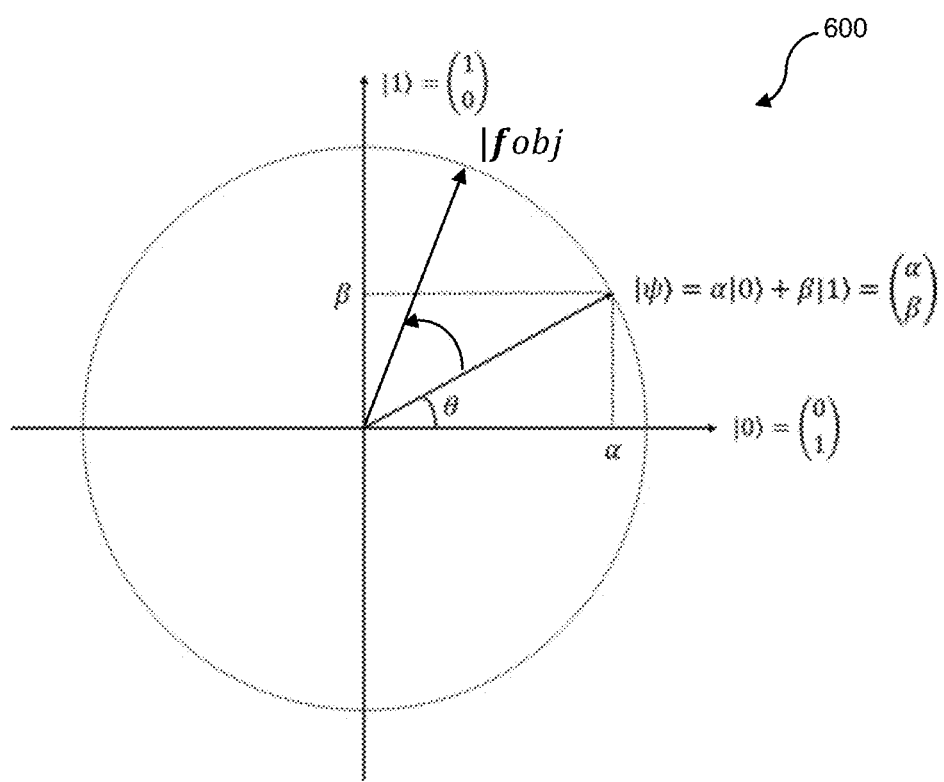
FIG. 6 illustrates a Hilbert space that geometrically represents a quantum variable $|\psi_j\rangle$ that is rotated to its optimal value in accordance with an exemplary embodiment of the present invention.

This superposition of qubits is illustrated in FIG. 6. That is, the probability of a state of a qubit $|\psi_j\rangle$ is not only a wave function but also the superposition of these two quantum states $|0\rangle$ and $|1\rangle$. Therefore, a quantum collection of m chromosomes, each chromosome having a length of n genes, is represented in the vector form as follows:

$$\begin{pmatrix} \alpha_{11} & \alpha_{21} & \cdots & \alpha_{j,1} & \cdots & \alpha_{n,1} \\ \beta_{11} & \beta_{21} & \cdots & \beta_{j,1} & \cdots & \beta_{n,1} \end{pmatrix}_1, \begin{pmatrix} \alpha_{1,2} & \alpha_{2,2} & \cdots & \alpha_{j,2} & \cdots & \alpha_{n,2} \\ \beta_{1,2} & \beta_{2,2} & \cdots & \beta_{j,2} & \cdots & \beta_{n,2} \end{pmatrix}_2, \cdots,$$

-continued $$\begin{pmatrix} \alpha_{1i} & \alpha_{2i} & \cdots & \alpha_{j,i} & \cdots & \alpha_{n,i} \\ \beta_{1i} & \beta_{2i} & \cdots & \beta_{j,i} & \cdots & \beta_{n,i} \end{pmatrix}_i, \cdots, \begin{pmatrix} \alpha_{1m} & \alpha_{2m} & \cdots & \alpha_{j,m} & \cdots & \alpha_{n,m} \\ \beta_{1m} & \beta_{2m} & \cdots & \beta_{j,m} & \cdots & \beta_{n,m} \end{pmatrix}_m$$

At step 505, initial values are randomly assigned to the quantum population (or colony) $Q_0$. In many preferred aspects of the present invention, each gene in the chromosome is forced to have equal probability distribution of 50%. That is, the value of each gene is made to have the qubit value of $|0\rangle$ which is represented by the vector $$\begin{pmatrix} 1 \\ 0 \end{pmatrix}$$

Their Hadamard matrix is $$\frac{1}{\sqrt{2}} \begin{pmatrix} 1 & 1 \\ 1 & -1 \end{pmatrix}.$$

The vector represent each gene in the chromosome in the population is:

$$H.|0\rangle = \frac{1}{\sqrt{2}} \begin{pmatrix} 1 & 1 \\ 1 & -1 \end{pmatrix} \begin{pmatrix} 1 \\ 0 \end{pmatrix} = \frac{1}{\sqrt{2}} \begin{pmatrix} 1 \\ 1 \end{pmatrix}$$

Then, the rotation matrix $$R = \begin{pmatrix} \cos(\theta) & -\sin(\theta) \\ \sin(\theta) & \cos(\theta) \end{pmatrix}$$

is applied with the magnitude of angle θ set arbitrarily in the $$\left(0; \frac{\pi}{2}\right]$$

for each gene in ine chromosome. The $j^{th}$ gene of the $i^{th}$ chromosome in the population after the initialization step has the vector form of:

$$\begin{pmatrix} \alpha_{j,i} \\ \beta_{j,i} \end{pmatrix} = \begin{pmatrix} \cos(\theta_{j,i}) & -\sin(\theta_{j,i}) \\ \sin(\theta_{j,i}) & \cos(\theta_{j,i}) \end{pmatrix} \frac{1}{\sqrt{2}} \begin{pmatrix} 1 \\ 1 \end{pmatrix}$$

At step 506, the quantum population is measured against the objective function $f_{obj}$ to determine the fitness value for each gene or qubit. Step 506 further includes a measurement step and a decoding. In performing step 506, the genes or qubits collapse to the values between $|0\rangle$ or $|1\rangle$. The initial superposition of the genes is destroyed.

The measurement in the standard basis is modeled in accordance with the collapse model of superposition principle of the wave equation in the form:

$$\begin{cases} p(\alpha) \leq |\alpha_{j,i}^2| \rightarrow x_{j,i} = 0 \\ p(\alpha) > |\alpha_{j,i}^2| \rightarrow x_{j,i} = 1 \end{cases}$$

Therefore, after finishing the measurements for the entire quantum population, a classical population is obtained in the vector form:

$(x_{11}\ x_{21}\ x_{31}\ \ldots\ x_{j,1})_1, (x_{12}\ x_{22}\ x_{32}\ \ldots\ x_{j,2})_2, \ldots, (x_{1i}\ x_{2i}\ x_{3i}\ \ldots\ x_{j,i})_i, \ldots, (x_{1m}\ x_{2m}\ x_{3m}\ \ldots\ x_{j,m})_m$ Where $x_{j,i} \in \{0; 1\}$.

With the binary sequence $(x_{1i}, x_{2i}, x_{3i} \ldots x_{j,i})$ corresponding to each chromosome after the measurement in the standard basis, the decoding step in the decimal system that represents the value of the optimal value in the following formula:

$$value = LB + \frac{decimal}{2^j} \times (UB - LB)$$

With value being a real number of the optimized variable, the decimal being an unsigned decimal of the binary sequence $(x_{1i}, x_{2i}, x_{3i} \ldots x_{j,i})$. LB and UB bring the lower bound and the upper bound of the optimal variables respectively. After obtaining the real value of the optimal variables, the appropriate value is calculated by interacting with the simulation software tool such as Cadence Virtuoso. See FIG. 1.

The real values of the optimized variables after being decoded will be exported into a file in the .txt format. Afterwards, the Spectre simulation module of the Cadence Virtuoso, via a file programmed according to an automatic simulation language Ocean. The real values of the optimal variables are read out important parameters. After the simulation is completed, the values of these parameters are exported to a result .txt file. The quantum emulator software program reads these real values to calculate the fitness value for each chromosome or the gene according to a fitness function previously defined.

Continuing with step 506, in the present invention an interaction between the quantum evolutionary algorithm and the circuit simulation of Cadence Virtuoso using the two parametric values and the results to calculate the fitness values for each chromosome in the entire quantum population. As an non-limiting example, an objective function $f_{obj}$ defined as $f_{obj}$ (a, b, c, d, ...) with a, b, c, d, ... being the values of the variables need to be optimized. The fitness value of the function $f_{obj}$ of the set of parameter under investigation saved in the parametric file will be calculated based on the results of the simulation of the variables needed to be optimized saved in the result file. Depending on the design objectives, the objective function for each circuit may be different. The objective function is a function whose variables are the values of the parameters to be optimized.

At step 507, the current quantum population is quantum rotated to bring the state of the genes to the optimal genes. Step 507 uses the rotation matrix R.

$$R = \begin{pmatrix} \cos(\theta) & -\sin(\theta) \\ \sin(\theta) & \cos(\theta) \end{pmatrix}$$

Optimal genes of the population are those which have the best fitness values.

Figure 7:
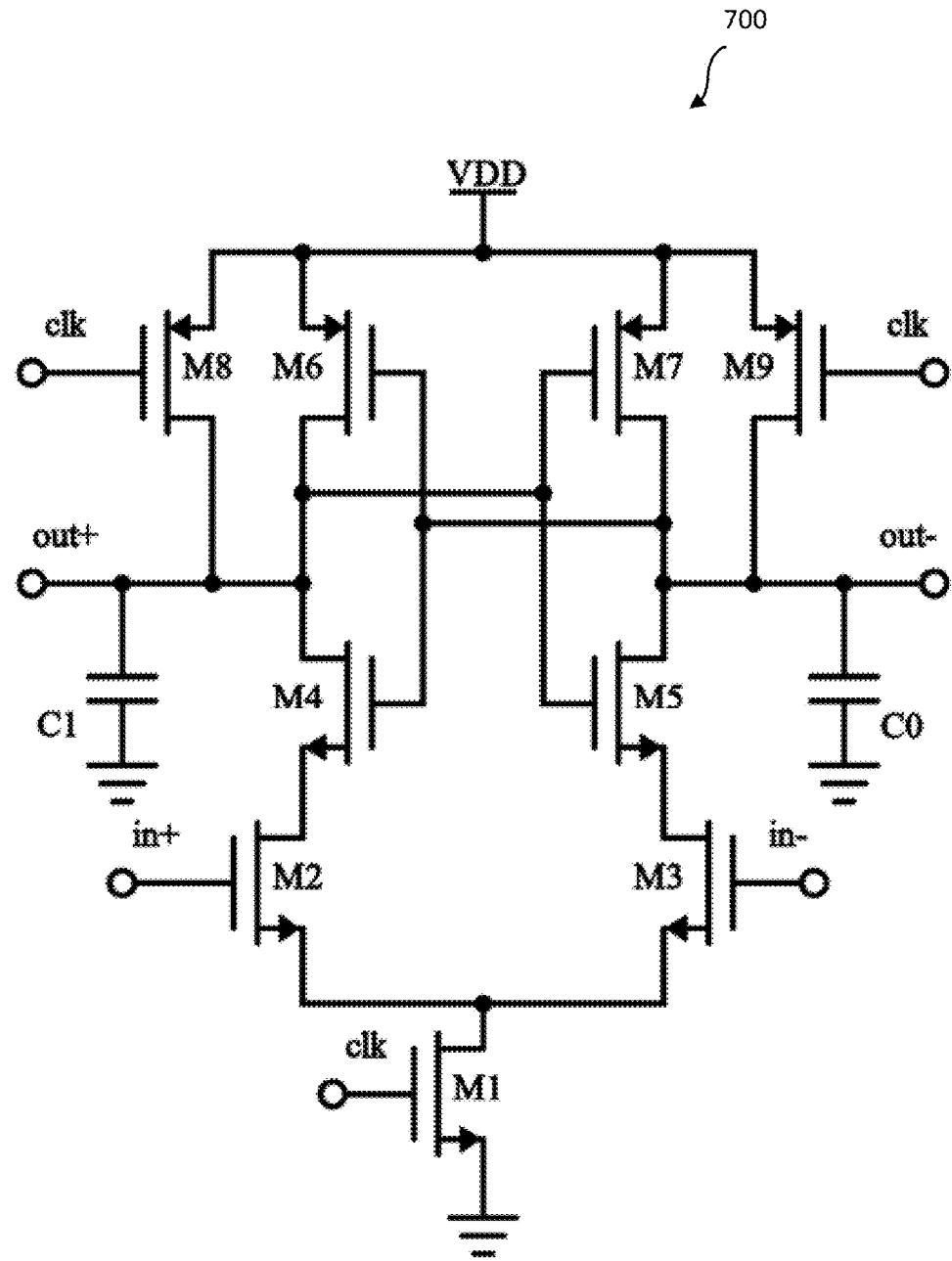
FIG. 7 illustrates a schematic diagram of an analog dynamic comparator that is designed using the method and the quantum emulator system of the present invention.

Step 507 is carried out as follows: Let $x_{j,i}$ being the $j^{th}$ gene of the $i^{th}$ chromosome. When the measurement is performed and $b_j$ being the jth gene of the optimized chromosome in the population. The comparison table for the rotation angle $\delta$ as shown in FIG. 7.

TABLE 1

Truth Table

| $x_j$ | $b_j$ | $f(x_j) \geq f(b_j)$ | $\delta$ |
|---|---|---|---|
| 0 | 0 | False | 0 |
| 0 | 0 | True | 0 |
| 0 | 1 | False | $+\delta$ |
| 0 | 1 | True | 0 |
| 1 | 0 | False | $-\delta$ |
| 1 | 0 | True | 0 |
| 1 | 1 | False | 0 |
| 1 | 1 | True | 0 |

At step 508, from Table 1 above, individual gene $x_j$ determined with 0 rotation angle are output and those with $+\delta$ or $-\delta$ are selected to be mutated in the next offspring.

At step 509, new population or offspring are created. Step 509 includes quantum rotation further including immersion, and mutation as shown in FIG. 6.

Mutation is realized with a definite crossover rate. Two quantum chromosomes before the measurements with the representing vectors:

$$\begin{pmatrix} \alpha_{1k} & \alpha_{2k} & \ldots & \alpha_{j,k} & \ldots & \alpha_{n,k} \\ \beta_{1k} & \beta_{2k} & & \beta_{j,k} & & \beta_{n,k} \end{pmatrix}_k \text{ and } \begin{pmatrix} \alpha_{1t} & \alpha_{2t} & \ldots & \alpha_{j,t} & \ldots & \alpha_{n,t} \\ \beta_{1t} & \beta_{2t} & & \beta_{j,t} & & \beta_{n,t} \end{pmatrix}_t$$

If the mutation probability is satisfied, after the mutation new quantum population or offspring is obtained.

$$\begin{pmatrix} \alpha_{1k} & \alpha_{2t} & \ldots & \alpha_{j,t} & \ldots & \alpha_{n,t} \\ \beta_{1k} & \beta_{2t} & & \beta_{j,t} & & \beta_{n,t} \end{pmatrix}_{k'} \text{ and } \begin{pmatrix} \alpha_{1t} & \alpha_{2k} & \ldots & \alpha_{j,k} & \ldots & \alpha_{n,k} \\ \beta_{1t} & \beta_{2k} & & \beta_{j,k} & & \beta_{n,k} \end{pmatrix}_{t'}$$

The mutation is realized with a finite mutation rate.

The mutation uses the matrix of the Pauli quantum gate X.

$$X = \begin{pmatrix} 0 & 1 \\ 1 & 0 \end{pmatrix}$$

If the probability of mutation satisfies, the mutation is applied to the $j^{th}$ qubit of the $i^{th}$ chromosome is as followed.

$$\begin{pmatrix} \alpha'_{j,i} \\ \beta'_{j,i} \end{pmatrix} = \begin{pmatrix} 0 & 1 \\ 1 & 0 \end{pmatrix} \begin{pmatrix} \alpha_{j,i} \\ \beta_{j,i} \end{pmatrix}$$

In other words, the mutation is to swap the amplitude of the probability distribution of the $j^{th}$ qubit of the $i^{th}$ chromosome. Then, the next quantum generation $Q_{t+1}$ is measured in according to step 506. Steps 506-511 are repeated.

At step 510, individual genes which meet the optimization requirements are output to CAD/CAE/EDA IC design 101. Step 510 is implemented by API 496 that sends the results to the CAD/CAE/EDA module 497.

At step 511, the quantum evolution operation ends. The optimal solution or optimal chromosome is used to run the simulation program. In practice, step 511 is realized by CAD/CAE/EDA module 497 that executes CAD/CAE/EDA software program 481.

Below is a sample software codes of algorithm 500 written in Python programming language and uploaded in the Github.

```
import math
import random
import numpy as np
import matplotlib.pyplot as plt
import sys
import pandas as pd
import datetime as dt
import os
########################################################################
#                    ALGORITHM PARAMETERS                   #
########################################################################
popSize = 16              # Define here the population size
genomeLength = 16         # Define here the chromosome length
generation_max = int(sys.argv[1])    # Define here the maximum number of
                          # generations/iterations
# define range for input
bounds = [[0.85, 4.0], [0.23, 0.4], [0.7, 1.0], [0.06, 0.4], [2, 2.8], [18.0, 23.0], [0.1, 1.0], [16.0, 22.0], [0.25,
0.5], [0.3, 1]] # w01, l01, w23, l23, w47, w5, l457, w6, l6, Cc
# Initialization global variables
theta          = 0
iteration      = 0
the_best_chrom = 0
generation     = 0
########################################################################
#                    VARIABLES ALGORITHM                    #
########################################################################
top_bottom = 2
QuBitZero = np.array([[1], [0]])
QuBitOne = np.array([[0], [1]])
AlphaBeta = np.empty([top_bottom])
fitness = np.empty([popSize]) # different from np.array, BE CAREFUL
probability = np.empty([popSize])
# qpv: quantum chromosome (or population vector, QPV), nqpv: new qpv
qpv = np.empty([popSize, genomeLength*len(bounds), top_bottom])
nqpv = np.empty([popSize, genomeLength*len(bounds), top_bottom])
# chromosome: classical chromosome
chromosome = np.empty([popSize, genomeLength*len(bounds)],dtype=int)
child1 = np.empty([popSize, genomeLength*len(bounds), top_bottom])
child2 = np.empty([popSize, genomeLength*len(bounds), top_bottom])
global_best_fitness = 0
global_best_chrom = np.empty([genomeLength*len(bounds)])
########################################################################
#              QUANTUM POPULATION INITIALIZATION            #
########################################################################
def Init_population( ):
   # Hadamard gate
   r2 = math.sqrt(2.0)
   h = np.array([[1/r2, 1/r2],[1/r2,-1/r2]])
   # Rotation Q-gate
   theta = 0
   rot = np.empty([2,2])
   # Initial population array (individual × chromosome)
   i = 0; j = 0
   for i in range(0,popSize):
      for j in range(0,genomeLength*len(bounds)):
         theta = np.random.uniform(0,1)*90
         theta = math.radians(theta)
         rot[0,0] = math.cos(theta); rot[0,1] =-math.sin(theta)
         rot[1,0] = math.sin(theta); rot[1,1]=math.cos(theta)
         AlphaBeta[0] = rot[0,0]*(h[0][0]*QuBitZero[0]+h[0][1]*QuBitZero[1]) +
rot[0,1]*(h[1][0]*QuBitZero[0]+h[1][1]*QuBitZero[1])
         AlphaBeta[1] = rot[1,0]*(h[0][0]*QuBitZero[0]+h[0][1]*QuBitZero[1]) +
rot[1,1]*(h[1][0]*QuBitZero[0]+h[1][1]*QuBitZero[1])
         # alpha squared
         qpv[i,j,0] = np.around(1*pow(AlphaBeta[0],2),2)
         # beta squared
         qpv[i,j,1] = np.around(1*pow(AlphaBeta[1],2),2)
########################################################################
#                MAKE A QUANTUM MEASUREMENT                 #
########################################################################
# p_alpha: probability of finding qubit in alpha state
def Measure(p_alpha):
   for i in range(0,popSize):
      for j in range(0,genomeLength*len(bounds)):
         if p_alpha <= qpv[i, j, 0]:
            chromosome[i,j] = 0
         else:
            chromosome[i,j] = 1
```

```
##################################################################
#                   DECODE POPULATION                            #
##################################################################
def decode(bounds, n_bits, bitstring):
    decoded = list( )
    largest = 2 ** n_bits
    for i in range(len(bounds)):
        # extract the substring
        start, end = i * n_bits, (i * n_bits) + n_bits
        substring = bitstring[start:end] # end is exclusive
        # convert bitstring to a string of chars
        chars = ''.join([str(s) for s in substring])
        # convert string to integer
        integer = int(chars, 2)
        # scale integer to desired range
        value = bounds[i][0] + (integer / largest) * (bounds[i][1] - bounds[i][0])
        # store
        value_rounded = np.round(value, 2)
        decoded.append(value_rounded)
    return decoded
```

In sum, software program 500 is created in DIY (do it yourself) and executed in Python programming language in the following steps:

(a) Create a quantum program;

(b) Create one or more qubits (chromosomes) and classical registers to measure the qubits;

(c) Create a quantum circuit which groups the qubits in a logical execution unit;

(d) Apply a quantum gates rotation to the qubits to achieved the optimal results;

(e) Measure the qubits in the classical registers to collect final optimal results;

(f) Compile the program in a specific format;

(g) Run the simulator; and (h) Fetch the results to the CAD/CAE/EDA module.

Now referring to FIG. 6, a two dimensional (2D) Hilbert space 600 illustrating a quantum inspired optimization process of a quantum variable $|\psi_j\rangle$. Quantum variable $|\psi_j\rangle$ is a superposition of two quantum states (or basis vectors) $|0\rangle$ and $|1\rangle$. Geometrically, the quantum state of a variable is represented as $|\psi_j\rangle = \alpha_j|0\rangle + \beta_j|1\rangle$. This superposition is represented in the matrix form as $$|\psi_j\rangle \leftrightarrow \begin{pmatrix} \alpha_j \\ \beta_j \end{pmatrix},$$

where $\alpha_j$ and $\beta_j$ are complex amplitudes defining the probabilities of finding $|\psi_j\rangle$; where $|\alpha_j|^2 + |\beta_j|^2 = 1$. For n dimensional space, a quantum variable can be represented by $$\begin{pmatrix} \alpha_{11} & \alpha_{21} & \cdots & \alpha_{j,1} & \cdots & \alpha_{n,1} \\ \beta_{11} & \beta_{21} & \cdots & \beta_{j,1} & \cdots & \beta_{n,1} \end{pmatrix}.$$

Thus, given an objective function $|fobj\rangle$ for each variable (or gene) in the Hilbert space, a search for optimal values is a vector rotation from $|\psi_j\rangle$ to $|fobj\rangle$. The vector rotations of n variables can be carried out simultaneously. It is proven that in search performance, quantum optimization $(n^{1/2})$ is faster than classical quick search $$[[(n/2)]]\frac{n}{2},$$

where n is the total number of variables. Additionally, it is proven that quantum inspired optimization can perform complex calculations that classical computers cannot.

Example 1: Dynamic Comparator Circuit Analysis

A schematic diagram of a dynamic comparator circuit 700 (dynamic comparator 700) is shown in FIG. 7. Dynamic comparator 700 is designed using algorithm 500 described above. Comparators such as dynamic comparator 700 are considered the heart of analog-to-digital converters (ADCs). They are used as a means to convert from analog domain signals to digital domain signals in modern signal processing and communications. In the design of high-speed ADCs, low-power and high-speed comparators are of great demand. Due to strong positive feedback and dynamic bias provided by a pair of cross-coupled inverters as the latching stage, dynamic comparators have higher speed and less static power consumption compared to static comparators. Therefore, with a view to optimizing the performance of dynamic comparator 700 with respect to speed and power consumption, the dynamic comparator is chosen as a feasible candidate. The analog circuit design consists of three main stages: topology selection, component sizing, and layout extraction. In the design of the comparator, the present invention focuses on the first two stages. Both stages must ensure that the resulting circuit meets the specifications. Since the first phase completes with the topology of dynamic comparator 700, the second phase involves choosing the size of components to meet design specifications. Due to the repetitive task of manual iteration of circuit parameters, this sizing procedure is considered time-consuming and monotonous. Hence, automation in the process of optimizing the sizes of circuits' components is critical to the ability to design high-performance circuits quickly [6].

Continuing with FIG. 7, the operation of the conventional single-tail dynamic comparator consists of two phases: the reset phase and the comparison phase.

The reset phase starts when the clock signal (Clk)=0. In this phase, reset transistors M8 and M9 are ON while a tail transistor M1 is OFF. As a result, output nodes out+ and out− are pulled up to $V_{DD}$, which ensures the initial condition as well as a valid logic level for comparator 600. The comparison phase (the decision making phase) starts when clk=$V_{DD}$. In this phase, reset transistors M8 and M9 are off while the tail transistor M1 is ON. Output nodes out+ and out−, previously precharged to $V_{DD}$, turn M4 and M5 ON. Also, these two output nodes begin to discharge their voltages, which is still high enough to keep M4 and M5 ON. The discharging rate of out+ and out− depends on the voltages at two input nodes in+ and in−. When in+>in−: Out+ discharges at a faster rate compared to out−. This means that the voltage at out+ drops to $V_{DD}-|V_{THP}|$ before out−, turning M7 ON before M6. Since transistor pairs (M4, M6) and (M5, M7) form back-to-back inverters, the latch regeneration is activated. Hence, out+ and out− are pulled down to GND and pulled up to $V_{DD}$, respectively. When in+<in−: The circuit works in the opposite manner with the final result of out+ and out− being pulled up to $V_{DD}$ and pulled down to GND, respectively. In summary, during the comparison phase:

The propagation delay is one of the key features of a comparator. It consists of two parts: Delay for the capacitors $C_0$ and $C_1$ to discharge to the point when M6 and M7 turn ON:

$$t_0 = \frac{C_i|V_{THP}|}{I_3} \approx \frac{C_i|V_{THP}|}{\frac{I_1}{2}} = 2\frac{C_i|V_{THP}|}{I_1}$$

Where Ci is the load capacitor at the output nodes with equal values (i=0, 1 and $C_0=C_1$); $V_{THP}$ is the threshold voltage of p-channel MOSFETs M6, M7; and $I_1$, $I_3$ are the drain currents through M1, M3, respectively. Delay from the two cross-coupled inverters: Since the threshold voltage of the comparator is considered to be half of the supply voltage, or $V_{DD}$, it means that:

$$\Delta V_{out} = \frac{V_{DD}}{2}$$

Where $\Delta V_{out}$ is the output voltage swing and $V_{DD}$ is the supply voltage. Therefore, the latch delay is calculated as:

$$t_{latch} = \frac{C_i}{gm_{eq}} \ln\left(\frac{\Delta V_{out}}{\Delta V_0}\right) = \frac{C_i}{gm_{eq}} \ln\left(\frac{V_{DD}/2}{\Delta V_0}\right)$$

Where $gm_{eq}$ is the equivalent transconductance of the latch and $\Delta V0$ is the output voltage difference. Also, at time $t_0$:

$$\Delta V_0 = |V_{out+} - V_{out-}| = \left|(V_{DD} - |V_{THP}|) - \left(V_{DD} - \frac{I_2 t_0}{C_i}\right)\right| = \left\|V_{THP}\right| - \left|\frac{I_2 t_0}{C_i}\right| = |V_{THP}|\left(1 - \frac{I_2}{I_3}\right)\right| = |V_{THP}|\left|\frac{\Delta I_{in}}{I_3}\right|$$

where $I_3$ is the drain current through M3 and $\Delta I_{in}$ is the current difference at the input ends. Since $I_3 \approx I_{1,2}$:

$$\Delta V_0 = |V_{THP}|\frac{\Delta I_{in}}{I_1/2} = \frac{2|V_{THP}|\sqrt{\beta_{2,3}I_1}}{I_1}\Delta V_{in} = 2|V_{THP}|\sqrt{\frac{\beta_{2,3}}{I_1}}\Delta V_{in}$$

Where $\beta_{2,3}=\beta_2$, $\beta_3$ are the current factors of M2, M3, respectively.

$$t_{latch} = \frac{C_i}{gm_{eq}}\ln\left(\frac{V_{DD}/2}{2|V_{THP}|\sqrt{\beta_{2,3}/I_1}\,\Delta V_{in}}\right) = \frac{C_i}{gm_{eq}}\ln\left(\frac{V_{DD}}{4|V_{THP}|\Delta V_{in}}\sqrt{\frac{I_1}{\beta_{2,3}}}\right)$$

The total delay is the sum of its two parts:

$$t_{delay} = t_0 + t_{latch} = 2\frac{C_i|V_{THP}|}{I_1} + \frac{C_i}{gm_{eq}}\ln\left(\frac{V_{DD}}{4|V_{THP}|\Delta V_{in}}\sqrt{\frac{I_1}{\beta_{2,3}}}\right)$$

The simulation results illustrate that $t_0$ dominates $t_{latch}$ and $t_{delay}$ follows the change in $t_0$. In other words, when $I_1$ decreases, $t_0$ increases and $t_{delay}$ hence increases, and vice versa.

Power Analysis:

Continuing with FIG. 7 and Example 1, In order to prevent inaccuracies at boundaries between operating regions, instead of MOSFET's existing models, its time-variant model is applied to analyze the power of the conventional dynamic comparator. The formula for drain current applicable to all operating regions is expressed in the work of as $$\text{Power}_{avg} = \frac{1}{T}\int_0^T V_{DD}I_{supply}dt = f_{clk}V_{DD}\int_0^T I_{supply}dt$$

Wherein $f_{clk}$ is the clock frequency of the comparator circuit, $V_{DD}$ is the power supply, $I_{supply}$ is the supply current. At this point, step 501 and 502 are realized and completed. Next, the optimization problem starts that realize step 503 to step 509.

Establishment of the Optimization Problems:

Dynamic comparator 700 is designed and simulated in the 65 nm technology of the TSMCN65 process. The operating frequency is $f_{clk}$=1 GHz and the supply voltage $V_{DD}$ is 1.2V. The voltage at the input terminal in− is remained stable at 1V as the reference voltage while the in+ being a voltage source having a maximum and minimum voltages being 1.005V and 0.995 V at 100 MHz frequency. With this arrangement, $\Delta V_{in}$=5 mV.

With respect to the case of optimal delay and power efficiency of the dynamic comparison, optimal variables are determined. Optimal variables are those mainly affect the results of the delay and power efficiency. The TSMCN65 process is used for design, the channel length of the conduction channels of all MOSFET in the integrated circuit is set to 65 nm. According to the time delay analysis, because $\Delta V_{in}$ of the dynamic comparison is set constant at 5 mV, $I_1$ and capacitors $C_0$, $C_1$ affect directly the time delay. Therefore, two variables that are related to the time delays are the width of the channel of M1 ($W_1$) and capacitor $C_{01}$. Similarly, with the value of $V_{DD}$ and the frequency of the clock signal clk is fixed at 1.2V and 1 GHZ, the variables related to the power supply are determined based on the $I_{supply}$ or the sum of four currents flowing through the MOSFET M6, M7, M8, M9. Because the symmetry of the circuit, the widths of M6, M7, M8, M9 are equal. Therefore, two more variables are declared: the widths of $M_6$ and $M_7$ ($W_{67}$), the widths of M8 and M9 ($W_{89}$). The widths of the remaining MOSFET are set to be W2=W3=0.21 μm, and W4=W5=0.12 μm. In total, three optimal variables are $W_1$, $W_{67}$, $W_{89}$, $C_{01}$. Please refer to step 502. To ensure the limits in the widths of the channels of the process and ensure the precision of the dynamic comparison, the results of the simulation evince the limits of the four variables mentioned above being 0.12 μm; 2 μm], [0.12 μm, 2 μm], [0.12 μm, 2 μm] and [0.1 fF, 0.8 fF].

The number of bits for each chromosome and the number of chromosomes in the population are 16 bits and 16 chromosomes respectively. While the immersion step has high probability, and low deviation probability is usually low; $r_{cross}$ and $r_{mut}$ belong to the intervals [0.8-0.95] and [0.001-0.05]. In some embodiments, $r_{cross}$ is selected to be $r_{cross}$=0.8 and $r_{mut}$=0.05.

Step 503 is realized as follows: the choice of an objective function to calculate the selectivity is also important. With the optimization the delay and the power consumption of the dynamic comparison, the objective function $f_{obj}$ is in the product of the time delay and power consumption:

$$f_{obj} = PDP = Delay \times Power$$

The comparison is considered good with low PDP value. This means that the low PDP equivocated to high selectivity or high objective value.

In other words, the optimization can be summarized as follows:

Minimizing PDP($W_1$, $W_{67}$, $W_{89}$)
Minimizing PDP($W_1$, $W_{67}$, $W_{89}$, $C_i$)
Satisfying L=65 nm, $W_2$=$W_3$=210 nm, $W_4$=$W_5$=120 nm
$\Delta V_{in}$=5 mV, $V_{DD}$=1.2 V, $f_{clk}$=1 GHz
0.12 μm≤$W_1$, $W_{67}$, $W_{89}$≤2 μm
0.1 fF≤$C_{01}$≤0.8 fF.

TABLE 2

The Optimization Results of the Dynamic Comparator

| Algorithm | Iteration | Product Power and Time Delay (PDP) (fJ) | Delay (ps) | Power (μW) |
|---|---|---|---|---|
| Classical Genetic Algorithm | 100 | 0.2254 | 72.48 | 3.11 |
| Quantum Genetic Algorithm | 75 | 0.2052 | 73.56 | 2.79 |

From Table 2, the quantum genetic algorithm shows that the results of the optimization the dynamic comparator are better in that the iteration number is less than 25% and the product delay power 10% better than the classical genetic algorithms.

Figure 8:
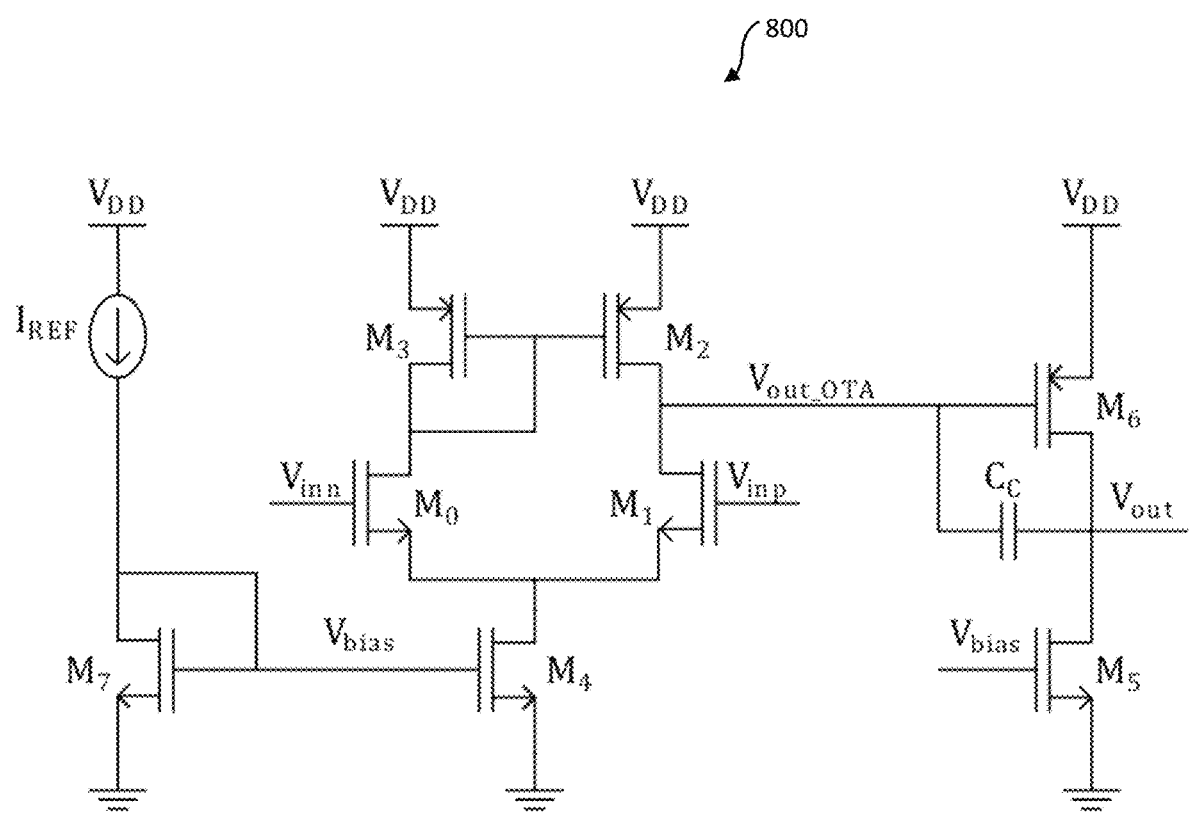
FIG. 8 shows the schematic diagram of a two-staged op-am circuit using the QEA-CAD/CAE/EDA method in accordance with an exemplary aspect of the present invention.

Example 2: Optimization of the Gain, Bandwidth, Power Consumption, and Phase Margin of the Two-Stage Op-Amp Circuit The schematic diagram of the two-stage op-amp circuit 800 is shown in FIG. 8. When design op-amp circuit 800, assume that the current flowing through the amplification stage is kIref. At that moment, $W_5/L_5$=k$W_4/L_4$=k$W_7/L_7$ (with $L_5$=$L_4$=$L_7$). In addition, to guarantee the symmetry of the amplification in the first stage $W_0/L_0$=$W_1/L_1$ và $W_2/L_2$=$W_3/L_3$. $M_6$ MOSFET in the common amplification S is adjusted to ensure the operation of the saturation region.

To ensure circuit 800 operate correctly, the MOSFETs need to be complementary to operate in the saturation region. The supply voltage $V_{ov}$≥30 mV; $V_{sat}$≥30 mV (depending on the design specification the 30 mV value may change accordingly). To guarantee the stability of circuit 800, capacitor $C_c$ is connected to compensate for circuit 800. Additionally, the output is connected to the load capacitor $C_L$.

Variables Need to be Optimized

Gain

The total gain of circuit 800 equals to the product of the gain of the differential stage and the gain of the common stage.

$A_v = A_{v_{diff}} \times A_{v_{cs}} = g_{m1} \quad (r_{o2} \| r_{o3}) \times g_{m6} \quad (r_{o6} \| r_{o5}) = g_{m1} R_{diff} \times g_{m6} R_{CS}$ (with $R_{diff}$=($r_{o2}\|r_{o3}$), $R_{CS}$=($r_{o6}\|r_{o5}$)) being the output resistance of the differential stage and the common S stage.

Bandwidth

The Transfer Function of Op-Amp 800:

$$H(s) = \frac{v_{out}(s)}{v_{id}(s)} = \frac{A_v(1 - s/z)}{(1 + s/p_1)(1 + s/p_2)}$$

With the two poles $p_1$, $p_2$ and zeroes z:

$$p_1 = \frac{1}{R_{CS}(C_c + C_L) + R_{diff}(C_c + C_{diff}) + g_{m6}R_{CS}R_{diff}C_c} \approx \frac{1}{g_{m6}R_{CS}R_{diff}C_c}$$

$$p_2 = \frac{g_{m6}C_c}{C_{diff}C_{CS} + C_{diff}C_c + (C_{CS} + C_L)C_c} \approx \frac{g_{m6}C_c}{(C_{CS} + C_L)C_C} = \frac{g_{m6}}{C_{CS} + C_L} \approx \frac{g_{m6}}{C_L}$$

With $C_{diff}$, $C_{CS}$ being the respective output capacitances of the common stage S and the differential stage. Commonly, $p_2 \ll p_1$, $p_1$ considered to be the highest pole. Therefore, the BW of circuit 800:

$$W \approx p_1 = \frac{1}{g_{m6}R_{CS}R_{diff}C_c}$$

Consumption Power $$P = (V_{DD} - V_{SS})(I_5 + I_7)$$

Phase Margin

The gain bandwidth product of Op-amp circuit 800:

$$UGBW = A_V \times BW = g_{m1}R_{diff} \times g_{m6}R_{CS} \times \frac{1}{g_{m6}R_{CS}R_{diff}C_c} = \frac{g_{m1}}{C_c}$$

$$PM = \pm 180 - \tan^{-1}\left(\frac{GBW}{p_1}\right) - \tan^{-1}\left(\frac{GBW}{p_2}\right) - \tan^{-1}\left(\frac{GBW}{z}\right)$$

Optimization Setup: This is the realization of step 505 to step 509

Op-amp circuit 800 is designed and simulated using 65 nm process of TSMCN65. The voltage supply $V_{DD}$=1.2V, $V_{SS}$=0V, the reference current $I_{REF}$=20 μA, the output capacitor $C_L$=1 pF. The common-mode voltage of the two input of the differential mode is $V_{in_{CM}}$=650 mV.

The ensure the copy of the currents of the current mirror, it is necessary to have $W_5/L_5$=k$W_4/L_4$=k$W_7/L_7$ (with $L_5$=$L_4$=$L_7$). Therefore, three variables to be optimized being $W_5$, $W_{47}$, $L_{457}$. In addition, to guarantee the symmetry of the differential stage, $W_0/L_0$=$W_1/L_1$ and $W_2/L_2$=$W_3/L_3$, four optimized variables $W_{01}$, $L_{01}$, $W_{23}$, $L_{23}$. Additionally, two optimized variables for MOSFET $M_6$ being $W_6$, $L_6$ and one optimized variable for $C_c$. Therefore, the optimization problem for circuit 800 (two staged op-amp circuit) uses 10 variables: $W_{01}$, $L_{01}$, $W_{23}$, $L_{23}$, $W_{47}$, $W_5$, $L_{457}$, $W_6$, $L_6$, $C_c$. To ensure the saturation condition, $V_{ov}$ and $V_{sat}$ in all MOSFETS M0-M7, the value of the optimized variables discussed above being:

$W_{01} \in [0.85$ µm, 4 µm$]$, $L_{01} \in [0.23$ µm, 0.4 µm$]$, $W_{23} \in [0.7$ µm, 1 µm$]$, $L_{23} \in [0.06$ µm, 0.4 µm$]$, $W_{47} \in [2$ µm, 2.8 µm$]$, $W_5 \in [18$ µm, 23 µm$]$, $L_{457} \in [0.1$µ, 1 µm$]$, $W_6 \in [16$ µm, 22 µm$]$, $L_6 \in [0.25$ µm, 0.5 µm$]$, $C_c \in [0.3$ pF, 1 pF$]$.

The bit for each chromosome and the chromosome in the population being 16 bit and 16 chromosomes. While the immersion has high probability, the deviation probability is low $r_{cross}$ and $r_{mut}$ lie in periods [0.8; 0.95] and [0.001; 0.05]. With this set up, $r_{cross}=0.8$ and $r_{mut}=0.05$ are selected.

Finally, the selection of an objective function to calculate the fitness value is also important. With the optimization goals of the gain, bandwidth, power consumption, and phase margin of circuit 800, the objective function is selected:

$$f_{obj} = \frac{UGBW \times C_L}{I_{REF}} \times PM$$

$$f_{obj} = \frac{UGBW \times C_L}{I_{REF}} \times \frac{\tan(PM)}{\tan(60)}$$

Op-amp circuit 800 is considered to work better with higher $f_{obj}$ values. This means that the $f_{obj}$ value of is high mean that the selectivity is higher.

In other words, the optimization problem of op-amp circuit 800 is summarized as follows:

optimizing $f_{obj}$ ($W_{01}$, $L_{01}$, $W_{23}$, $L_{23}$, $W_{47}$, $W_5$, $L_{457}$, $W_6$, $L_6$, $C_c$)

satisfying $V_{DD}=1.2V$, $V_{SS}=0V$, $V_{in\_CN}=650$ mV, $I_{REF}=20$ µA, $C_L=1$ pF $A_V > 40$ dB, UGBW$>40$ MHz, PM$>60°$, P$<250$µW $W_{01} \in [0.85$ µm, 4 µm$]$, $L_{01} \in [0.23$ µm, 0.4 µm$]$, $W_{23} \in [0.7$ µm, 1 km$]$, $L_{23} \in [0.06$ µm, 0.4 µm$]$, $W_{47} \in [2$ µm, 2.8 µm$]$, $W_5 \in [18$ µm, 23 µm$]$, $L_{457} \in [0.1$µ, 1 µm$]$, $W_6 \in [16$ µm, 22 µm$]$, $L_6 \in [0.25$ µm, 0.5 µm$]$, $C_c \in [0.3$ pF, 1 pF$]$.

Example 1 and Example 2 show that algorithm 500 implemented by QEA computer 400 of the present invention obtains the following objectives:

(1) reducing the iteration number;

(2) increase the convergence rate to the universal optima instead of being trapped in the local optima;

(3) set a foundation for the application of other quantum-inspired optimization algorithms in the IC design tasks.

(4) assist in designing complex electrical circuitry that are beyond the human capabilities, such as 2 nm process and billion of transistors per semiconductor die.

It is noted that the Spectre simulator allows the use of the SKILL programming language's syntax in Ocean-based scripts. In view of the role of the Spectre simulator in the overall optimization system, the flexibility of SKILL programming establishes the preference of Spectre over its HSPICE counterpart in terms of manipulating output data. In recognition of GA's strengths and Spectre's convenience of data output, this paper proposed a GA-Spectre model that might break new ground as the prototype for the optimization problem of propagation delay and power dissipation for the dynamic comparator design. With only 100 iterations of GA, the optimized dynamic comparator achieved a power-delay product (PDP) of 0.2258 fJ, including an average delay of 72.61 ps and power consumption of 3.11 µW at a 1 GHz clock frequency and 1.2 V supply voltage. These are desirable and promising values for assessment parameters, especially for the case of PDP since this work's PDP surpasses its counterparts in the works of [8-11]. More importantly, thanks to its flexibility and adaptability, our GA-Spectre framework could also be the optimization tool for different circuits, which is likely to revolutionize the mindset and work approach of analog circuit design engineers.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and

TABLE 3

The Results of the Optimization of the Two-Stage Op-Amp Circuit

| Algorithm | Iteration | $f_{obj} = \frac{UGBW \times C_L}{I_{REF}} = \times \frac{\tan(PM)}{\tan(60)}$ $f_{obj} = \frac{UGBW \times C_L}{I_{REF}} \times PM$ | $A_V$(dB) | UGBW(MHz) | PM(°) | P(µW) |
|---|---|---|---|---|---|---|
| Classical Genetic Algorithm | 100 | 3.117 | 55.45 | 57.73 | 61.87 | 211.2 |
| Quantum Genetic Algorithm | 85 | 241.754.564 | 50.92 | 74.73 | 64.7 | 216.8 |

From the Table 3, the QEA provides the optimization of circuit 800 better with the iteration 15% less than and the value of the objective function $f_{obj}$ 30% better than the classical genetic algorithm.

spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should, therefore, be construed in accordance with the appended claims and any equivalents thereof.

DESCRIPTION OF NUMERALS

- 100 CAD/CAE/EDA IC design and Quantum Evolution Algorithm
- 101 CAD/CAE/EDA IC design module
- 102 Quantum Evolution Algorithm (QEA) module
- 103 initial conditions and constraint input
- 104 optimal solution output
- 200 CAD/CAE/EDA and QEA system
- 201 user or IC designer
- 202 input/output interface
- 203 processor
- 210 CAD/CAE/EDA program
- 211 geometric modeling module
- 212 engineering analysis module
- 213 design review and evaluation module
- 214 CAD module
- 214 storage for CAD/CAE/EDA models
- 220 quantum computing unit
- 221 software library
- 230 quantum computer emulator
- 231 Q-RAM
- 232 Q-circuits
- 300 graphic user interface (GUI)
- 310 layout
- 311 file menu
- 312 layout menu
- 313 wires menu
- 314 vias (holes)
- 315 layers menu
- 316 pins menu
- 317 ESC button
- 320 general menus
- 321 edit menu
- 322 view menu
- 323 import menu
- 324 schematic drawing menu
- 325 tools menu
- 326 manager menu
- 327 setup menu
- 328 option menu
- 330 connection menus
- 331 home menu
- 332 forum menu (chat room)
- 333 world wide web (connected to the internet)
- 334 users (other users)
- 335 end of internet connection
- 340 design and optimization menus
- 341 QEA mode
- 341 start the quantum emulator
- 341-2 select parameter file
- 341-3 run menus
- 341-4 output the optimization results
- 342 design menu
- 343 simulation menu
- 344 graphs menu
- 345 numerical analysis
- 346 results
- 347 output the final design
- 400 quantum emulator computer system
- 410 network (cloud)
- 421 classical computer
- 431 classical computer
- 432 classical computer
- 433 classical computer
- 434 classical computer
- 435 classical computer
- 440 quantum emulator computer (QEA) for IC design
- 441 CPU/GPU
- 442 power supply
- 443 network interface card (NIC)
- 444 ROM/RAM
- 445 display unit
- 446 keyboard
- 447 audio interface
- 448 pointing interface
- 449 I/O interface
- 450 loop control unit
- 461 communication channel
- 470 memory
- 471 OS
- 472 BIOS
- 480 data storage
- 481 CAD/CAE/EDA models
- 482 quantum computing library (quant
- 490 QEA emulator
- 491 initialize
- 492 quantum loop or iteration
- 493 quantum rotation
- 494 mutation
- 495 measurement
- 496 API
- 497 CAD/CAE/EDA design module
- 600 superposition nature of qubits
- 700 dynamic comparator
- 800 two-stage op-amp circuit

What is claimed is:

1. A computer implemented method for designing electrical circuitry, comprising:
   (a) determining types and number of parameters to be optimized and their respective upper boundaries (UB) and lower boundaries (LB) in either binary or decimal formats for said electrical circuitry using a CAD/CAE/EDA module of a quantum emulator computer; and (b) optimizing said parameters in qubit formats using a quantum evolution optimization module constrained by said UB and said LB, wherein said quantum emulator computer further comprises said CAD/CAE/EDA module and said quantum evolution optimization module, wherein said step of optimizing said parameters further comprises:
  (i) initializing an initial quantum population based on said types and number of said parameters;
  (ii) measuring said initial quantum population by collapsing each of said qubits in said quantum population into a binary string $(x_{11}, x_{21}, x_{31} \ldots x_{j,1})_1$, $(x_{12}, x_{22}, x_{32} \ldots x_{j,2})_2, \ldots, (x_{1i}, x_{2i}, x_{3i} \ldots x_{j,i})_i, \ldots, (x_{1m}, x_{2m}, x_{3m} \ldots x_{j,m})_m$ with $x_{j,i} \in \{0;1\}$; and
  (iii) decoding said binary string by applying a predetermined formula comprising:

$$\text{value} = LB + \frac{\text{decimal}}{z^j} \times (UB - LB),$$

wherein a value is a magnitude of each of said parameter to be optimized in a real number domain {R} and a decimal is an unsigned decimal number of said binary string, and wherein j is a total number of bits in said binary string.

2. The computer implemented method of claim 1 further comprising:
  (c) outputting optimal values of said parameters in said binary or decimal formats to said CAD/CAE/EDA module; and
  (d) designing and simulating said electrical circuitry using said optimal values.

3. The computer implemented method of claim 2 wherein (i) said step of outputting optimal values of said parameters further comprises using an application interface (API) module configured to automatically transfer said optimal values to said CAD/CAE/EDA module.

4. The computer implemented method of claim 3 further comprises: receiving said optimal values from said API module, forming a circuit model that fits said parameters and said optimal values, rendering said circuit model to a graphic representation, and simulating and present said circuit model using said CAD/CAE/EDA module.

5. The computer implemented method of claim 3 wherein said initializing step (i) further comprises:
  mapping said parameters to be optimized into said initial quantum population further comprising a plurality of chromosomes and wherein each chromosome further comprises a plurality of genes or said qubits, and wherein each of said qubit is represented by a quantum 0 symbolized as: $|0\rangle$ or a quantum 1 symbolized as: $|1\rangle$; wherein each chromosome is represented by $|\psi\rangle^i = \Sigma_j c_i |\psi_j\rangle$ which is represented by a vector in a form of $$|\psi_j\rangle \leftrightarrow \begin{pmatrix} a_j \\ \beta_j \end{pmatrix}.$$

6. The computer implemented method of claim 5 wherein said initializing step (i) further comprises: assigning equal probability to each of said chromosome by applying a Hadamard matrix $$\frac{1}{\sqrt{2}} \begin{pmatrix} 1 & 1 \\ 1 & -1 \end{pmatrix}$$

to each of said gene in said chromosome and applying a rotation matrix $$R = \begin{pmatrix} \cos(\theta) & -\sin(\theta) \\ \sin(\theta) & \cos(\theta) \end{pmatrix}$$

and wherein an angle $\ominus$ belongs to an interval $$\left(0; \frac{\pi}{2}\right].$$

7. The computer implemented method of claim 1 wherein said measuring said initial quantum population further comprises applying a formula $$\begin{cases} p(\alpha) \le |\alpha_{j,i}^2| \rightarrow x_{j,i} = 0 \\ p(\alpha) > |\alpha_{j,i}^2| \rightarrow x_{j,i} = 1 \end{cases}.$$

8. The computer implemented method of claim 1 further comprising determining an objective function ($f_{obj}$) for said quantum population by applying said parameters to be optimized to calculate a product of power consumption and time delay in said electrical circuitry.

9. The computer implemented method of claim 1 further comprising determining an objective function ($f_{obj}$) for said quantum population by applying said parameters to be optimized to calculate a product of bandwidth and gain of said electrical circuitry.

10. The computer implemented method of claim 1 further comprising generating a new quantum population by rotating said initial quantum population to an optimal angle using a rotation matrix $$R = \begin{pmatrix} \cos(\theta) & -\sin(\theta) \\ \sin(\theta) & \cos(\theta) \end{pmatrix}.$$

11. The computer implemented method of claim 10 further comprising determining and selecting said chromosomes that need further a rotation $\delta\ominus$ angle to said optimal angle to update said quantum population.

12. The computer implemented method of claim 11 further comprising outputting said chromosomes whose rotation angle is 0 in said decimal format to said CAD/CAE/EDA module.

13. The computer implemented method of claim 1 further comprising mutating said quantum population by applying a quantum Pauli gate $$X = \begin{pmatrix} 0 & 1 \\ 1 & 0 \end{pmatrix}$$

to a $j^{th}$ chromosome using a formula $$\begin{pmatrix} \alpha'_{j,i} \\ \beta'_{j,i} \end{pmatrix} = \begin{pmatrix} 0 & 1 \\ 1 & 0 \end{pmatrix} \begin{pmatrix} \alpha_{j,i} \\ \beta_{j,i} \end{pmatrix}.$$

14. A computer system for designing and simulating an electrical circuitry, comprising:
   a CAD/CAE/EDA module operable to assisting in a design and a simulation of said electrical circuitry; and
   a quantum emulator module, electrically coupled to said CAD/CAE/EDA module, operable, to perform the following steps:
      (a) determining types and number of parameters to be optimized and their respective upper boundaries (UB) and lower boundaries (LB) in either binary or decimal formats for said electrical circuitry using said CAD/CAE/EDA module; and
      (b) optimizing said parameters in qubit formats using a quantum evolution optimization module constrained by said UB and said LB, wherein said quantum emulator module further comprises said quantum evolution optimization module, wherein said optimizing said parameters further comprises:
         (j) initializing an initial quantum population based on said types and number of said parameters;
      measuring said initial quantum population by collapsing each of said qubits in said quantum population into a binary string $(x_{11}, x_{21}, x_{31} \ldots x_{j,1})_1, (x_{12}, x_{22}, x_{32} \ldots x_{j,2})_2, \ldots, (x_{1i}, x_{2i}, x_{3i} \ldots x_{j,i})_i, \ldots, (x_{1m}, x_{2m}, x_{3m} \ldots x_{j,m})_m$ with $x_{j,i} \in \{0; 1\}$; and
      decoding said binary string by applying a predetermined formula to said binary string, said predetermined formula is defined as $$\text{value} = LB + \frac{\text{decimal}}{2^j} \times (UB - LB),$$

wherein a value is a magnitude of each of said parameter to be optimized in a real number domain $\{R\}$ and a decimal is an unsigned decimal number of said binary string, and wherein j is a total number of bits in said binary string.

15. The computer system of claim 14 wherein said quantum emulator module further comprises:
   a quantum random access memory (Q-RAM) for storing said parameters in qubit formats; and
   a quantum circuit (Q-circuits) for performing quantum gate calculations including quantum inversion, quantum mutation, and quantum rotation.

16. The computer system of claim 15 wherein said quantum emulator module further comprises a software library for storing quantum emulator software programs.

17. The computer system of claim 16 wherein said CAD/CAE/EDA module further comprises circuitry models for different design applications.

18. The computer system of claim 17 further comprises an application interface (API) module configured to automatically transfer said optimal values to said CAD/CAE/EDA module.

19. The computer system of claim 18 wherein said algorithm further comprises:
   outputting optimal values of said parameters in said binary or decimal formats to said CAD/CAE/EDA module; and
   designing and simulating said electrical circuitry using said optimal values.

20. The computer system of claim 19 wherein said CAD/CAE/EDA module further comprises:
   registers operable to receive said optimal values from said API module;
   a geometric modeling module and an engineering analysis model operable to form a circuit model that fits said parameters and said optimal values;
   a CAD graphic module operable to render said circuit model to a graphic representation;
   a design review and valuation module operable to simulate present said circuit model.

\* \* \* \* \*